Patented Sept. 30, 1924.

1,510,238

UNITED STATES PATENT OFFICE.

GEORGE H. MAXWELL, OF PHOENIX, ARIZONA.

SHOE-BOTTOM FILLER AND METHOD OF MAKING SAME.

No Drawing. Original application filed September 14, 1921, Serial No. 500,711. Divided and this application filed August 28, 1922. Serial No. 584,879.

*To all whom it may concern:*

Be it known that I, GEORGE H. MAXWELL, a citizen of the United States, and resident of Phoenix, in the county of Maricopa and State of Arizona, have invented an Improvement in Shoe-Bottom Fillers and Methods of Making Same, of which the following description is a specification.

This is a division of my application No. 500,711, filed September 14, 1921, being restricted to the shoe bottom filler and method of making the shoe-bottom filler therein explained.

This kind of filler, generically considered, was patented July 30, 1907, No. 861,555. This kind of filler has heretofore always been put on the market in the form of loaves as shown in the drawing of Patent No. 832,002, of Sept. 25, 1906, to be used as described in Patent No. 808,224 of Dec. 26, 1905 and as further set forth in Patent No. 808,227 of Dec. 26, 1905, but in this loaf form and subject to the use as set forth in said patents, the process was always quite slow and laborious due to the fact that the filler when in a compressed loaf or large mass is impervious to quick penetration by heat, the heat being able to attack only the outside of the loaf and that slowly which is rendered still slower by the character of the cork and the binder which necessitates low heat as the cork would char or lose its life or resiliency under a continued high heat. All of the aforesaid patents and their mutual relations in constituting a new system are further set forth in the federal decisions contained in vol. 252 Federal Reporter, pages 148 to 176.

Accordingly my present invention aims to produce the filler ready for the market in the form of small fragments or fragmentary portions as distinguished from the large loaf form, above, and having a substantially non-compressed, open condition, so that later they may be readily and very quickly penetrated by heat and therefore melted in a fraction of the time possible heretofore.

In the preferred embodiment of the present application, I first copiously wet the supporting surface and deposit thereon a relatively thick layer of the filler in question in a hot, sticky and sluggishly fluid condition, the wetting of the supporting surface being for the purpose of interposing between said surface and the filler a medium which will repel the natural tendency of the hot, sticky filler to stick irremovably to the support, said wetting of the support also operating to chill the contacting bottom surface of the filler. Having deposited the relatively thick layer of said filler in said condition as stated, I then skim off or remove the surplus top filler so as to leave a relatively thin layer or sheet of said hot filler in an uncompressed condition. By thus removing the surplus filler so as to leave the desired amount only, I avoid compressing and densifying the sheet of filler. I then remove the heat from this sheet of filler until the latter is substantially set and coherent. This heat removal may be accomplished by the presence of cooling apparatus such as refrigerating pipes or any other suitable means or condition for accomplishing or permitting the cooling. At some stage in the process, subsequent to the skimming step, I subdivide the sheet into segregated portions. Also I interpose above and below said sheet a top layer and under layer of dry comminuted material such as cork, the idea being to have each of the segregated small pieces of the filler entirely enveloped in a surrounding jacket or protector of such comminuted dry material so that these small pieces will remain permanently and easily separable from each other and will not be liable to be stuck together again in substantially the original mass or non-segregated relation. Preferably the above process is all carried out progressively on a moving support such, for instance, as a belt. In such case I prefer to deliver a layer of cork to the belt at the start for receiving the heap of filler and then later deliver a second layer of cork on top of the thinned layer or sheet of said filler. Also, when made in this moving belt-like or progressive manner, the segregating is preferably accomplished at the end by tearing the sheet at its end into small fragments. The advantage and main object of this preferred manner of segregating the sheet is to avoid unduly compressing the small pieces. If desired, the enveloping of the pieces with the cork may be accomplished at this end of the process after the sheet has been cooled to a substantially rigid or self-sustaining coherent condition, by delivering a blast of dry cork against the sheet or in any other way dusting the sheet with dry cork or equivalent dry comminuted material. For instance the small fragments or segregated pieces of filler may be caused or permitted to drop into a mass of dry cork or the like where they may be agitated by hand or otherwise until thoroughly coated. They are then ready for packing and shipment to the shoe factories.

I do not mean that the fragments or segregated pieces are or remain wholly separated, as of course the extremely sticky nature of the filler prevents entire separation being maintained after the pieces are brought together in mass, as when packed for shipment, but I mean that the fragments or pieces are individually loose or open internally and that when in a mass said fragments are relatively loose or open with relation to each other. In other words the mass (when in or as dumped from a box or crate and when again packed or dumped into the applying machine to be melted with steam and heat) is made up of a multitude of small, fragmentary portions, each in a noncompressed or open condition, and all approximately held from one another by the intervening envelopes of the relatively dry dust or comminuted material. The mass is subdivided into said small pieces by intervening planes or dividing surfaces of slight resistance formed by the material originally dusted dry onto the said small pieces. Only as much of the dry material remained on as would stick and hence the pieces when put into a box become stuck together in a mass but only slightly and although there is a resultant actual mass condition it is not homogeneous but is subdivided or cut here and there throughout into its original small pieces or fragments by planes, areas or surfaces of slight resistance to penetration by steam and separation by hand or a small shovel.

The above method or process is capable of great expedition and enables me to handle the hot filler in such a manner that it is manageable and not liable to stick either to its support or in unwarranted measure to itself. It quickly becomes stiff and coherent, may be stripped from its support readily and when dusted or coated with the dry comminuted enveloping material and severed into small pieces or fragments the latter can be handled with impunity and without liability of sticking permanently or non-removably to each other or to the container in which said pieces are shipped. And the resulting filler mass is more easily handled in the shoe factory, cooperates with the heat and steam of the applying machine and is more speedy and tractable.

This application is one of several concurrent and copending applications which together constitute a new system of handling and using shoe filler for and in connection with shoe manufacture, my application Serial No. 560,800 covering the machine for use in the shoe factory in applying the filler of the present application to the shoe bottom, Serial No. 500,709 covering the process of the application of said filler to the shoe bottom and Serial No. 500,711 (the parent of the present case) covering the apparatus for forming said filler, while the preferred type of filler (and method of making) best adapted to all the foregoing is covered in Patents 1,032,312 and 1,121,688, the broad process of using in Patents 1,118,161, and 1,227,502, and the machine for using (considered broadly in certain respects) in Patent 1,225,372.

My present invention is further defined in the following claims:

1. The process, consisting of interposing a thin layer of filler between layers of dry comminuted material like cork and then tearing the said layer into small pieces.

2. The process, consisting of copiously wetting a supporting surface, depositing thereon a relatively thick layer of hot, sticky, sluggishly fluid filler, skimming off or removing the surplus top filler so as to leave a thin layer or sheet of uncompressed hot filter, removing the heat from the sheet of filler until the latter is substantially set and coherent, and at some stage in the process subsequent to the skimming step subdividing the sheet into segregated portions.

3. The process, consisting of copiously wetting a supporting surface, depositing thereon a thin layer or sheet of filler in a hot, sticky, sluggishly fluid condition, removing the heat from the sheet of filler until the latter is substantially set and coherent, at some stage in the process enveloping said filler in dry comminuted cork-like material, and at some stage in the process when the thin layer is at least partially cooled forming it into small pieces or cakes.

4. The process, consisting of copiously wetting a supporting surface, depositing thereon a relatively thick layer of hot, stick, sluggishly fluid filler, skimming off or removing the surplus top filler so as to leave a thin layer or sheet of uncompressed hot filler, removing the heat from the sheet of filler until the latter is substantially set and coherent, at some stage in the process coating said filler on both sides with dry comminuted material like cork, and at some stage in the process subsequent to the skimming step subdividing the sheet into segregated portions.

5. The process, consisting of providing a relatively thick layer of hot, sticky sluggishly fluid shoe-bottom filler, skimming off or removing the surplus top filler so as to leave a thin layer or sheet of uncompressed hot filler, removing the heat from the sheet of filler until the latter is substantially set and coherent, and at some stage in the process when the thin layer is at least partially cooled but still resilient and flexible forming it into small pieces or cakes.

6. The process, consisting of providing a relatively thick layer of hot, sticky, sluggishly fluid shoe bottom filler, skimming off or removing the surplus top filler so as to leave a thin layer or sheet of uncompressed hot filler, removing the heat from the sheet of filler until the latter is substantially set and coherent, at some stage in the process when the thin layer is at least partially cooled but still resilient and flexible forming it into small pieces or cakes, and at some stage in the process subsequent to the skimming step enveloping the filler with dry comminuted material like cork, whereby when a multitude of the small pieces of filler are subsequently packed or boxed the resulting mass or package of filler will be only slightly stuck together being subdivided into said small pieces by intervening planes of slight resistance formed by the said dry comminuted material.

7. The process, consisting of forming a thin layer or sheet of filler in a hot, sticky sluggishly fluid condition, removing the heat from the sheet of filler until the latter is substantially set and coherent, at some stage in the process when the thin layer is at least partially cooled but still resilient and flexible forming it into small pieces or cakes, and at some stage in the process enveloping the filler with dry comminuted material like cork, whereby when a multitude of the small pieces of filler are subsequently packed or boxed the resulting mass or package of filler will be only slightly stuck together being subdivided into said small pieces by intervening planes of slight resistance formed by the said dry comminuted material.

8. The process of handling hot, sticky, sluggishly fluid shoe-bottom filler, consisting of forming a thin layer thereof by removing without substantial compression all the superposed filler excepting said thin layer, cooling said thin layer and then forming it into cakes, continuing the entire process without substantial compression on the filler except for such compression as is inevitable in forming the cakes.

9. The process of handling hot, sticky, sluggishly fluid shoe-bottom filler, consisting of forming a thin layer thereof by removing without substantial compression all the superposed filler excepting said thin layer, cooling said thin layer, continuing the entire process without substantial compression on the filler except for such compression as is inevitable in forming the cakes, and at some stage in the process forming the thin sheet into cakes or small pieces without substantial compression of the cakes.

10. The herein described process of handling hot, sticky, granular shoe-bottom filler, consisting of providing a relatively thick layer of such filler in said condition, removing all but a thin layer thereof when the filler is at a temperature of slight adhesion and cohesion, so as to leave said thin layer without compression, and so maintaining the filler without compression until firmly coherent and adherent, and at some stage in the process subsequent to forming said thin layer dusting the filler on both sides with dry comminuted material such as cork and subdividing the sheet into segregated portions, whereby said portions are open in the sense of being substantially non-compacted and are held substantially free from each other by the intervening layers of dry cork.

11. The herein described process of handling hot, sticky, sluggishly fluid shoe-bottom filler, consisting of pouring a mass of the filler in a heap when it is hot and semifluid, skimming off the top so as to leave a bottom sheet or layer of the filler without substantial compression, cooling the same until substantially set or coherent, then tearing the layer into small pieces, and dusting the latter to prevent their sticking together, whereby the filler mass consists of a multitude of small fragmentary portions, each in a highly non-compressed or open condition.

12. The herein described process of handling hot, sticky, sluggishly fluid shoe-bottom filler, consisting of providing a filler of the kind designated and which is naturally and normally loose and non-compacted when hot, but capable of being compacted and condensed, heating said filler to a degree in which it assumes said non-compacted condition, and shaping it into cakes or other small fragmentary pieces, while maintaining it at all times until set in said non-compacted condition, whereby it is thereafter more quickly amenable to heat, especially in the form of percolating steam.

13. An article of manufacture, consisting of a filler mass of granular, normally sticky shoe-bottom filler, formed in a plurality of small portions, each in a highly non-compressed or open condition, divided from each other by intervening areas of relatively dry comminuted material such as cork stuck yieldingly to adjacent portions so as to hold the filler together in a mass while constituting planes of cleavage and quick heat- and-steam-penetration, and each portion being internally sticky, permanently plastic at normal atmospheric temperature, melting under low heat, and then quickly-setting when allowed to cool in a shoe bottom.

14. As an article of manufacture, shoe-bottom filler of the kind described, consisting of a filler mass in the form of a multitude of small, fragmentary portions, each in a highly non-compressed or open condition, segregated from each other by relatively dry surfaces of dry comminuted material such as cork and each being internally sticky, permanently plastic at normal atmospheric temperature, melting under low heat and then quick-setting when allowed to cool in a shoe bottom.

15. As an article of manufacture, shoe-bottom filler of the kind described, consisting of a filler mass of material normally impervious to quick penetration of heat, said mass being subdivided by a multitude of planes or areas of slight resistance to penetration by steam into a corresponding multitude of small pieces or fragments of filler readily separable from each other along said planes, and said pieces having an open, substantially non-compressed condition, and being internally sticky, permanently plastic at normal atmospheric temperature, melting under low heat and then quick-setting when allowed to cool in a shoe bottom.

In testimony whereof, I have signed my name to this specification, in the presence of two subscribing witnesses.

GEORGE H. MAXWELL.

Witnesses:
 DUNCAN L. MACINTYRE,
 JOHN B. REID.